United States Patent [19]
Reuter

[11] Patent Number: 5,618,086
[45] Date of Patent: Apr. 8, 1997

[54] BRAKE SYSTEM MODULATOR WITH TWO-STAGE VALVE

[75] Inventor: David F. Reuter, Beavercreek, Ohio

[73] Assignee: General Motors Corporation, Detroit, Mich.

[21] Appl. No.: 537,190

[22] Filed: Sep. 29, 1995

[51] Int. Cl.$^6$ ..................................................... B60T 8/36
[52] U.S. Cl. ..................... 303/119.2; 137/599.1; 137/630.15
[58] Field of Search .............................. 303/199.2, 84.2; 137/599.2, 630.15, 596.17

[56] References Cited

U.S. PATENT DOCUMENTS

| | | | |
|---|---|---|---|
| 3,909,073 | 9/1975 | De Gennes | 137/599.2 |
| 5,163,474 | 11/1992 | Rizk | 303/119.2 |
| 5,186,093 | 2/1993 | Kervagoret | 303/119.2 |
| 5,370,450 | 12/1994 | Volz et al. | 303/119.2 |

FOREIGN PATENT DOCUMENTS

| | | | |
|---|---|---|---|
| 1293034 | 4/1969 | Germany | 137/599.2 |
| 1943692 | 9/1977 | Germany | 137/630.15 |

*Primary Examiner*—Matthew C. Graham
*Attorney, Agent, or Firm*—Jeffrey A. Sedlar

[57] ABSTRACT

A brake system includes a hydraulic module that controls fluid flow between the master cylinder and a wheel brake by means of a two-stage valve and a single release solenoid valve. The two-stage valve includes an outer poppet that carries an inner poppet both of which are normally open during base brake operation by means of an interacting piston that carries an integral ABS release orifice. During the ABS operation of the system, the inner and outer poppers are independently operable.

11 Claims, 4 Drawing Sheets

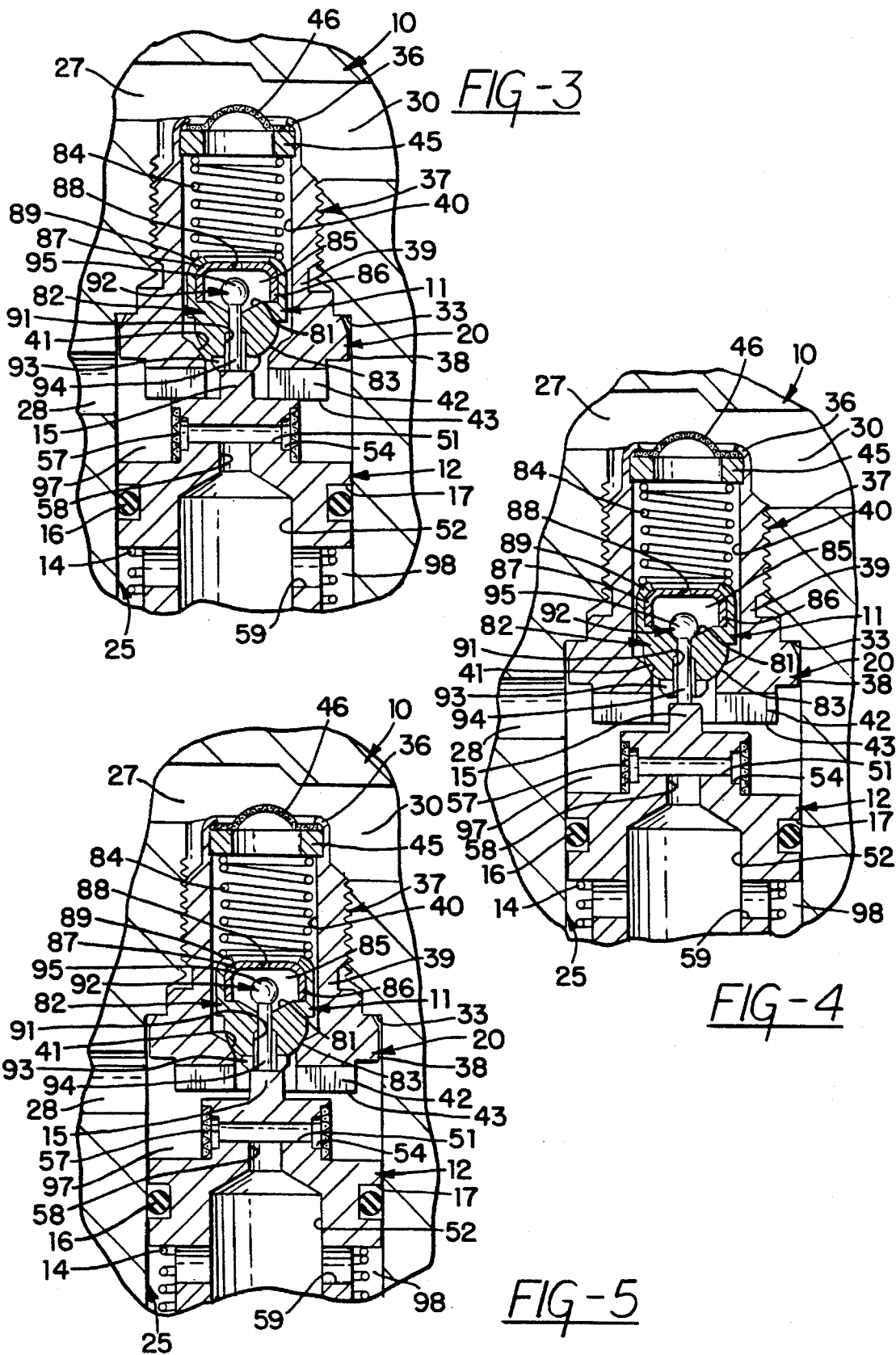

5,618,086

BRAKE SYSTEM MODULATOR WITH TWO-STAGE VALVE

BACKGROUND OF THE INVENTION

The present invention relates to fluid brake systems for vehicles. More particularly, the invention concerns the integration of anti-lock braking control into a vehicle's fluid brake system utilizing one solenoid per wheel.

Conventional vehicle fluid brake systems are characterized by providing the ability for effective wheel braking in response to manual application of force to a brake pedal actuator. It is known to adapt conventional vehicle fluid brake systems to automatic control mechanisms which intervene in the event of certain conditions and provide advanced braking functions. One such mechanism, an anti-lock braking system (ABS), generally represents a combination of hydraulic and electric controls.

A typical ABS system inhibits the vehicle's wheel brake from locking up by releasing the applied fluid pressure when an incipient wheel lock-up condition is sensed. After release of the fluid pressure wheel deceleration ceases and the wheel begins accelerating towards vehicle speed. When the wheel speed has substantially recovered, braking fluid pressure may be reapplied. The re-application of fluid pressure generally results in the wheel again approaching lock up and the cycle is repeated.

The art has proposed that ABS functions can be provided by employing several different mechanisms. The problem posed in developing an effective ABS braking system is to provide optimum operation considering system response, adaptability and efficiency while concurrently avoiding unnecessary complexity and cost. This presents a significant challenge in the development of vehicle braking systems utilizing ABS.

SUMMARY OF THE INVENTION

The present invention provides a braking system which utilizes a new hydraulic ABS modulator concept. The hydraulic circuit components include a solenoid valve that is normally closed and provides the ABS release function and a two-stage valve assembly that regulates two distinct flow rates depending on system operating conditions. In addition, a spring loaded piston assembly works in combination with the two-stage valve assembly. Other system components may generally include an electric motor which powers a hydraulic pump assembly that is used to re-circulate the fluid, a pump output damper assembly to minimize pump output pressure fluctuations during operation and an optional rear channel proportioner. The modulator operates to control the flow of fluid between the vehicle's master cylinder and wheel brakes and is capable of isolating the master cylinder from the wheel brakes and controlling wheel brake pressure automatically.

This invention includes a number of advantages as will be apparent to those skilled in the art. Among these are the use of half the typical number of electromechanical solenoid valves to perform the required ABS cycling compared to state-of-the-art designs which use both apply and release solenoids on each ABS channel. In addition, the use of relatively simple low-cost popper valve designs which do not require expensive slip fits or extremely tight and expensive tolerances is advantageous. The system's adaptability is also noteworthy.

By utilizing an optional bleed-flow design, feedback to the brake pedal during ABS operation can be reduced to extremely low levels. In addition, the cooperative operation of the two-stage valve and the spring-loaded piston provides a dead-band portion of travel which allows a transient no-flow condition to occur providing a hold cycle.

The invention is also adaptable to providing an optional release orifice bypass valve assembly. Two general characteristics considered in designing an ABS modulator are: providing a proper level of ABS release fluid flow and providing an appropriate degree of low pressure performance. By incorporating the ABS release orifice within a bypass valve these two characteristics may be independently optimized.

These being but a part of the system's many advantages. The following detailed description provides a further understanding of the overall system.

BRIEF DESCRIPTION OF THE DRAWINGS

FIG. 3 is a schematic illustration of a two-stage valve during base-brake flow operation.

FIG. 4 is a schematic illustration of a two-stage valve during ABS release operation.

FIG. 5 is a schematic illustration of a two-stage valve during ABS apply operation.

DETAILED DESCRIPTION OF THE PRESENTLY PREFERRED EMBODIMENTS

Figure 1:
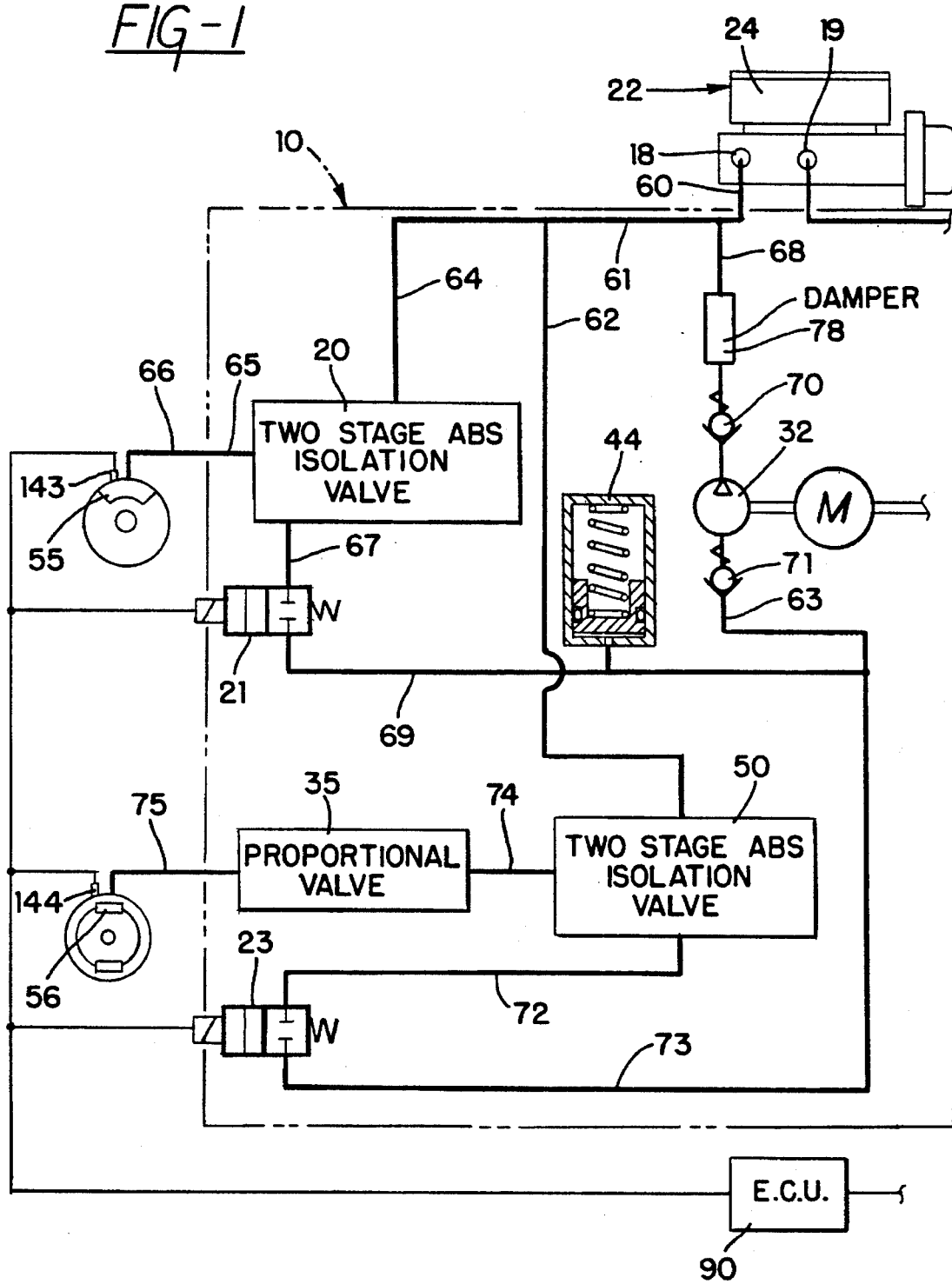
FIG. 1 is a partial graphic symbol fluid diagram of a brake system according to the present invention.

Referring to the drawings, illustrated in FIG. 1 is a master cylinder circuit of a diagonally split braking system with ABS capabilities. Shown is essentially half of a brake system according to the present invention. Master cylinder 22, pump 32 and electronic control unit (ECU) 90 operate with an entire system that includes an additional two-wheel brake control in the same manner as the control for wheel brakes 55 and 56. Generally, the portion of the system shown includes that portion of a brake modulator for applying one front and one rear wheel brake of a diagonally split two-channel system. The present invention is additionally readily adaptable to various other brake system configurations such as those which utilize a front-to-rear axial split brake circuit distribution. The invention is also readily adaptable to other variously configured multiple channel braking control systems.

In greater detail, master cylinder 22 includes fluid reservoir 24 integrated therewith for supplying fluid through ports 18 and 19 to two separate braking channels. The braking channel supplied by port 18 will be described in detail and is meant to illustrate both channels which are substantially identical. The master cylinder 22 is of the conventional dual piston type and includes dual pressure chambers, one in fluid communication with port 18 and the other being in fluid communication with port 19. Fluid reservoir 24 supplies fluid to the master cylinder 22 during operation and provides a locale for storage thereof. Master cylinder 22 operatively includes a conventional power booster (not illustrated), and is actuated by a cooperating brake pedal (not illustrated).

Leading from port 18 of master cylinder 22 is conductor 60 which leads to modulator 10 and communicates with conductor 61 therein. Conductor 61 branches into conductor 62 and 64. Conductor 62 generally supplies fluid to rear wheel brake 56. Conductor 64 generally supplies fluid to front wheel brake 55. Conductor 64 extends to isolator 20. Conductor 68 is interconnecting with conductor 64 and extends to pump 32 and includes check 70 and damper assembly 78. Damper 78 is preferably provided to dampen pulsation generated by the pump 32 during operation thereof and conventionally includes an orifice in combination with a variable volume device.

Figure 2:
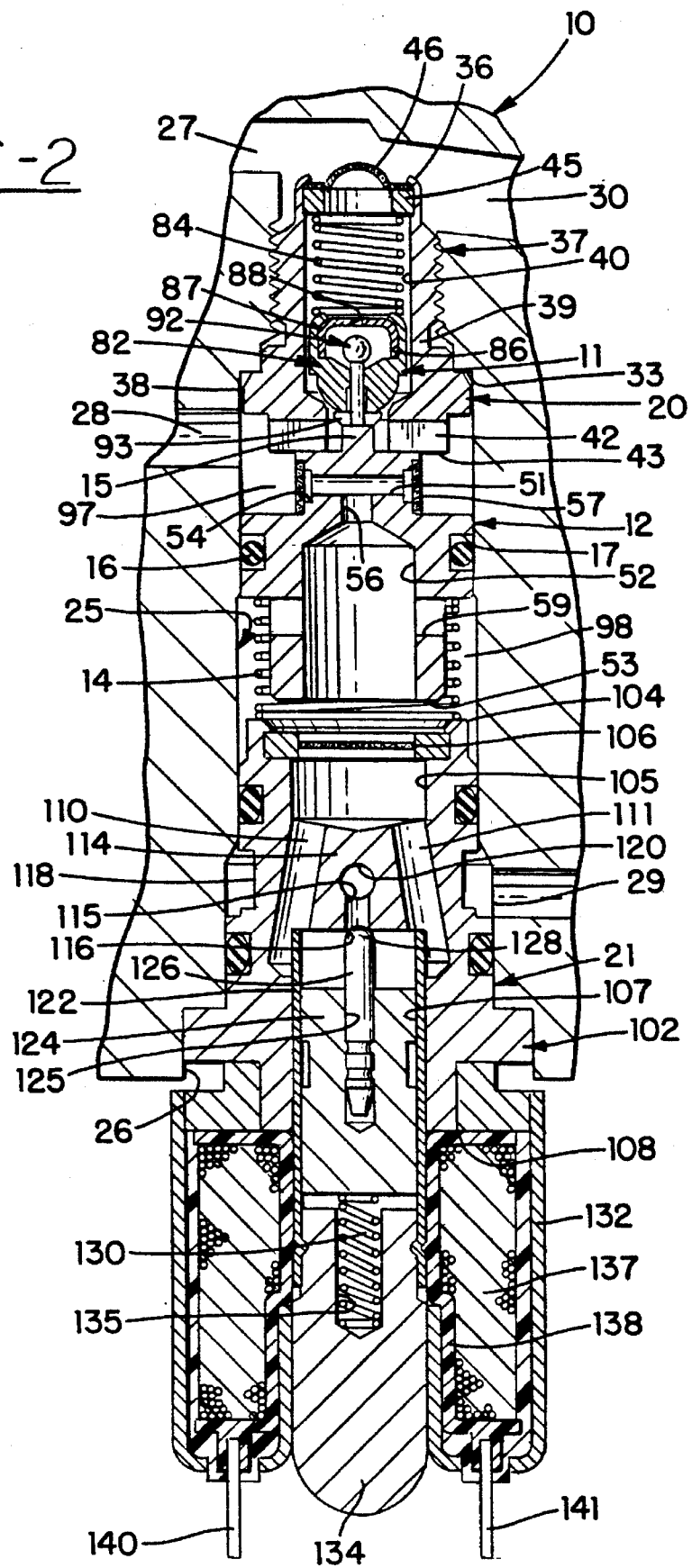
FIG. 2 is a fragmentary cross-sectional view of an ABS modulator.

Isolator 20 is illustrated in detail in FIG. 2 and in general, includes a two-stage valve 11 and a sliding release piston assembly 12. In its normally open condition, isolator 20 provides a substantially unrestricted fluid passage from the master cylinder 22 to the wheel brake 55 through associating conductor 60, 64, 65 and 66. When operated to a closed condition, isolator 20 prohibits flow through the system from the master cylinder 22 to the wheel brake 55.

Conductor 67 leads from isolator 20 to release solenoid valve 21. Release solenoid valve 21 comprises a normally closed spring return solenoid actuated valve. In its normally closed condition, release solenoid valve 21 prohibits flow between conductor 67 and conductor 69. Therefore, release solenoid valve 21 generally maintains the braking pressure at wheel brake 55 as supplied thereto through isolator 20 from master cylinder 22. Release solenoid valve 21 communicates with ECU 90 and when energized freely permits fluid flow between conductor 67 and 69.

Conductor 69 communicates with conductor 63 which includes check 71 and returns to pump 32 completing a circuit for the supply and return of fluid from pump 32 to wheel brake 55 or to master cylinder 22. Conductor 63 is also in fluid communication with accumulator 44. Accumulator 44 supplies the means for rapidly receiving released fluid from wheel brake 55 as supplied through release solenoid valve 21 for temporary storage and supply to pump 32 for delivery back to wheel brake 55 or master cylinder reservoir 24.

Conductor 62 communicates with conductor 60 and therethrough, is in fluid communication with port 18 of master cylinder 22 providing a means of supplying braking fluid to rear wheel brake 56. Conductor 62 extends to isolator 50. Isolator 50 is substantially the same as isolator 20 in construction and principle of operation although the orifice sizing may vary between the two isolators as determined by the specific system within which they operate.

Conductor 74 extends from isolator 50 and through proportioner 35 is in fluid communication with conductor 75 and therethrough, with rear wheel brake 56. Proportioner 35 selectively proportions fluid pressure to wheel brake 56 in relation to the pressure applied to wheel brake 55 from the master cylinder 22 and optionally, pump 32 as predetermined according to system design parameters.

Conductor 72 extends from isolator 50 to release solenoid valve 23. Release solenoid valve 23 is embodied as a normally closed spring return solenoid actuated valve. In its normally closed condition release solenoid valve 23 prohibits flow between conductor 72 and conductor 73. Therefore, release solenoid valve 23 maintains the applied pressure at wheel brake 56 as supplied thereto through isolator 50 by master cylinder 22 or pump 32. Release solenoid valve 23 communicates with ECU 90 for operation thereby. When energized, release solenoid valve 23 freely permits fluid flow between conductor 72 and 73. Conductor 73 communicates with conductor 63 completing a circuit for the supply and return of fluid from pump 32 to wheel brake 56 or master cylinder 22.

In base brake operation of the system, master cylinder 22 provides fluid flow to the front wheel brake 55 and rear wheel brake 56 through port 18 and to two other wheel brakes (not illustrated) through port 19. Upon actuation of master cylinder 22 fluid exits port 18 to the various conductors and through isolators 20 and 50 to wheel brakes 55 and 56, respectively. Fluid flow passes unrestricted through the isolators 20 and 50 to the wheel brakes. When master cylinder 22 operates to release pressure, fluid flow from the wheel brakes 55 and 56 flows uninhibited through the conductors and isolators back to the fluid reservoir 24.

Referring to FIG. 2, that portion of the modulator 10 carrying isolator 20 and release solenoid 21 is illustrated. Modulator 10 includes a primary bore 25 with an open end 26 for receiving the isolator 20 and release solenoid valve 21. Primary bore 25 includes a series of open segments reducing in diameter stepwise into the modulator 10.

Communicating with the primary bore 25 is a master cylinder port 27, a wheel brake port 28, a pump inlet port 29 and a pump outlet port 30. As a result, fluid flow between the master cylinder 22 and the wheel brake 55 and between the pump 32 and wheel brake 55 must pass through the primary bore 25.

Referring additionally to FIG. 3, a valve housing 37 is threadedly fixed in stepped primary bore 25 between the master cylinder port 27 and the wheel brake port 28. Valve housing 37 includes an annular section 38 that seats against shoulder 33 of primary bore 25. Valve housing 37 includes a generally cylindrical shaped wall 39 which forms a longitudinal bore 40 that extends completely through valve housing 37. Longitudinal bore 40 integrally forms valve seat 41. Valve housing 37 also includes cross-channel 42 at its caudal end 43. At its frontal end 36, wall 39 of valve housing 37 is crimped or otherwise formed in a partially closed fashion, to retain ring 45 and filter 46.

Assembled within longitudinal bore 40 is outer poppet 82 which is biased toward valve seat 41 by spring 84 such that parti-spherical section 83 is urged toward mating with valve seat 41. Outer poppet 82 also includes central opening 85 which is defined by cylindrical wall 86. The end of cylindrical wall 86 is turned inwardly to retain plate 87 in central opening 85. Plate 87 includes orifice 88. Wall 86 integrally forms shoulder 89 which engages the spring 84.

Outer poppet 82 includes poppet bore 91 which extends completely therethrough and is intersected by cross channel 93. An inner poppet 92 is carried in popper bore 91 and includes a stem 94 and integral ball 95 which is designed to seat against valve seat 81. Valve seat 81 is integrally formed by outer poppet 82 about poppet bore 91. The outer and inner poppets 82 and 92, in combination with the valve seats 41 and 81 respectively, form the two-stage valve 11 for controlling fluid flow through primary bore 25, between the master cylinder port 27 and the wheel brake port 28.

An inter-related release piston 12 is carried in the primary bore 25 and is forced against the caudal end 43 of the valve housing 37 by a return spring 14. Engagement with the caudal end 43 acts as a positive stop which accurately locates the release piston 12. Release piston 12 includes projection 15 which extends into longitudinal bore 40 of valve housing 37 when the release piston 12 is positioned against the caudal end 43. The force of return spring 14 is sufficiently strong to move the release piston 12 to unseat both the outer poppet 82 and the inner popper 92 through engagement with the projection 15 and by compressing the spring 84. The inner poppet 92 is oriented such that it is biased toward the valve seat 81 only by the weight of gravity. Therefore, the force of return spring 14 is also sufficiently strong enough to overcome the weight of the inner poppet 92.

Accordingly, when the release solenoid valve 21 is in its normally closed position, both the outer and inner poppets 82 and 92 are held in a position that will permit flow to occur. In the case of the outer popper 82, brake fluid flow freely occurs around the periphery of the outer poppet 82 across the valve seat 41 in an unrestricted fashion. Secondarily, flow is permitted to occur through the ABS supply orifice 88, around the inner poppet 92, across the valve seat 81 and through the poppet bore 91. Flow past the inner popper 92 continues through cross channel 93 and cross channel 42 into annular recess 97 which is formed between the valve housing 37 and the release piston 12 adjacent to the wheel brake port 28. Flow past the outer poppet 82 is directed through the cross channel 42 into the annular recess 97 and to the wheel brake port 28. Parallel flow paths are provided through the two-stage valve 11 by means of the outer poppet 82 and inner poppet 92 arrangement.

The release piston 12 is sealingly and slidably carried in the primary bore 25 by its substantially cylindrical configuration and seal 16 which is carried in groove 17. Release piston 12 also includes an internal bore 52 opening from end 53 which does not pass completely through the release piston 12. A cross bore 51 extends through release piston 12 and intersects annular groove 54 which is formed around the outer perimeter thereof. A filter 57 is secured around the outside of annular groove 54 to prevent contaminants from entering therein. An ABS release orifice 58 extends between cross bore 51 and internal bore 52 permitting fluid communication across release piston 12 between annular recess 97 and annular recess 98. The release piston 12 includes an additional cross bore 59 which intersects the internal bore 52 and ensures fluid communication between the annular recess 98 and the ABS release orifice 58.

In the base brake mode of operation, the ABS release orifice 58 operates to instantaneously equalize pressure between annular recesses 97 and 98 and thereby equalize pressure on both sides of the release piston 12. Because release solenoid valve 21 is in a normally closed position during base brake operation, substantially no fluid flow occurs through the ABS release orifice 58. This establishes a hydraulic lock which prevents the release piston 12 from moving and thus serves to keep both the outer poppet 82 and the inner poppet 92 in the full open position due to the force balance of the springs 14 and 84 as shown in FIG. 3.

When action occurs to reduce braking pressure at the wheel brake 55 by reducing or removing force from the brake pedal actuator, fluid is forced to flow from wheel brake 55 back to the expanding master cylinder 22. During this operation, fluid flow is directed back through the two-stage valve 11 with little restriction since the flowing fluid is capable of further compressing the popper return spring 84 providing an even wider flow path across the valve seat 41.

An additional valve housing 102 is positioned in primary bore 25 behind the release piston 12 and cooperates in forming the release solenoid valve 21. The valve housing 102 includes a frontal end 104 that forms an annular ledge against which piston return spring 14 bears. Entering the valve housing 102 from the frontal end 104 is a central bore 105 which extends only partially into the valve housing 102. A filter 106 is carried inside the central bore 105 adjacent the frontal end of 104. An armature bore 107 enters the valve housing 102 from its end 108 and extends only partially into the valve housing 102. A pair of intermediate bores 110 and 111 extend through the valve housing 102 between the central bore 105 and the armature bore 107.

A section of the valve housing 102, designated as body 114, remains between the central bore 105 and the armature bore 107. A longitudinal bore 115 extends partially into the body 114 from the armature bore 107. An annular shoulder on the body 114 about the longitudinal bore 115 forms a valve seat 116. In the area of the body 114 an annular groove 118 extends around the outer perimeter of the valve housing 102 at a location corresponding to the pump inlet port 29. A cross bore 120 extends through the body 114 and intersects the longitudinal bore 115 and the annular groove 118 providing a means of fluid communication therebetween.

The armature bore 107 is lined with a nonmagnetic sleeve 122 which slidably carries an armature 124. The armature 124 includes a bore 125 from which extends a rod 126 forming the moving valve element of the release solenoid valve 21 and including an engageable end 128 which is normally urged against the valve seat 116 by a spring 130.

A frame 132 is fixed to the valve housing 102 and extends outside the primary bore 25. The frame carries a pole piece 134 which includes a bore 135 for containing the spring 130. The frame also carries a coil 137 comprised of a plurality of tools of wire wound on a bobbin 138. Terminal pins 140 and 141 provide a means of communication between the ECU 90 and the coil 137.

When the coil 137 is energized, the armature 124 is drawn toward the pole piece 134 thus unseating the engageable end 128 from the valve seat 116 and opening a flow path from the annular recess 98 to the pump inlet port 29. Fluid flow passes through filter 106, central bore 105, intermediate bores 110 and 111, armature bore 107, across valve seat 116, through longitudinal bore 115, cross bore 120 and through annular groove 118 to pump inlet port 29. The force of spring 130 supplements the positive hydraulic sealing force that is communicated to bore 107 by the braking system to maintain release solenoid valve 21 in a closed position. Thus, the release solenoid valve 21 remains positively closed during base brake operation of the system, while de-energized.

To initiate the ABS mode of operation of the system, sufficient brake line pressure must be applied to the wheel brakes to cause one or more wheels to approach an incipient lock condition. Feedback to the ECU 90 such as from wheel speed sensors 143 or 144 prompts the ECU 90 to a decision that modulation of the wheel brake pressure is appropriate. With reference to FIG. 1, when this occurs the pump motor 31 is immediately turned on and continues to run for the remainder of the ABS cycle. The release solenoid valve 21 is also energized. High pressure fluid from the wheel brake begins flowing through the now open release solenoid valve 21 to the pump inlet port 29 and enters the accumulator 44.

The initiation of ABS release fluid flow through the ABS release orifice 58 creates a pressure differential between annular recesses 97 and 98 across the release piston 12. This pressure differential creates a force of sufficient strength to compress the piston return spring 14 causing the release piston 12 to move away from the two-stage valve 11. Sufficient piston displacement is allowed to cause closure of both the outer popper 82 and the inner poppet 92 against the respective valve seats 41 and 81 as shown in FIG. 4. This isolates the master cylinder 22 from the wheel brake closing off further fluid application flow.

Fluid released from the wheel brake is directed to the accumulator 44 and is eventually pumped back to the master cylinder 22 or wheel brake 55. For very low coefficient of friction surfaces, the pressure differential across the release piston 12 diminishes gradually. Wheel brake fluid pressure may be reduced to very low levels such as 15–25 pounds per square inch.

As pressure diminishes the force of the return spring 14 moves the release piston 12 back toward the two-stage valve 11 a distance sufficient to unseat only the inner poppet 92 as shown in FIG. 5. The outer poppet 82 remains closed since the much larger open area at seat 41, acted upon by the sufficiently large pressure differential between ports 27 and 28 requires a much larger opening force than provided by spring 14. When this occurs, flow is permitted to enter the wheel brake from the master cylinder 22 or pump 32, reapplying fluid braking force. This applied fluid flow is metered through the ABS apply orifice 88 which is specifically sized for the application. As fluid is admitted, wheel brake fluid pressure increases and the pressure differential across the release piston 12 increases as a result. By appropriately sizing the ABS release orifice 58 and the strength of the return piston 14, an equilibrium condition can be provided during ABS release operation at a sufficiently low pressure range such as 15–25 pounds per square inch or less, such that a low pressure condition is maintained indefinitely at the wheel brake.

Once wheel brake pressure is sufficiently reduced for a given time period and the wheel has reaccelerated to an appropriate speed, as detected by the wheel speed sensors 143 or 144, shown in FIG. 1, a re-allocation of pressure to the wheel brake is initiated. ABS apply fluid occurs by de-energizing the release solenoid valve 21 and thus shutting off outflow from the primary bore 25. This creates an equalization of pressure across the release piston 12 such that the return spring 14 moves the release piston 12 back toward the two-stage valve 11.

Figure 6:
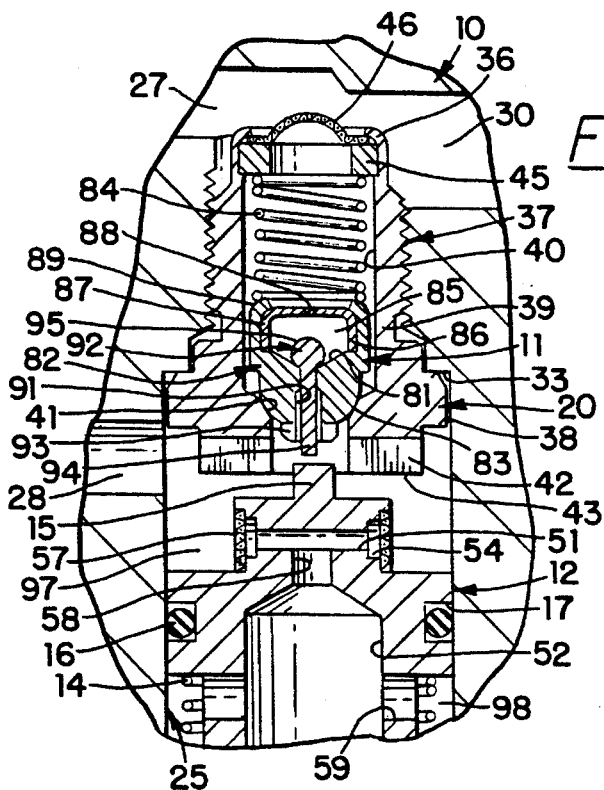
FIG. 6 is a detail illustration of a two-stage valve.

A small amount of dead-band travel as illustrated in FIG. 6 is provided prior to the time the projection 15 re-engages the two-stage valve 11. The dead-band travel results from the gap 96 between the projection 15 and inner poppet stem 94. Therefore, during a brief time period fluid flow is not permitted to be either released from or applied to the wheel brake. The gap 96 provides a mechanism for an equivalent transient hold cycle. This is desirable in-that it allows utilizing a smaller pump 32 and associating motor 31 in the system when modulating brake pressure during an ABS release cycle.

As the release piston continues to travel back toward the two-stage valve 11, it initially contacts the inner poppet 92 which is biased closed primarily by the pressure differential between ports 27 and 28 acting upon the very small open area of seat 81. The inner poppet is forced open after contact since the piston return spring 14 is designed to ensure that the inner poppet can in general, be reopened at master cylinder pressures exceeding 5,000 pounds per square inch.

After the inner poppet 92 is opened, the release piston 12 under the force of the return spring 14 will attempt to force open the outer poppet 82. However, the effective sealing diameter of the outer poppet 82 on the valve seat 41 is sufficiently large such that the return spring 14 is not strong enough to force open the outer poppet 82 until the pressure differential between the master cylinder 22 and the wheel is approximately 50 pounds per square inch or less. At this relatively small pressure differential the system effectively resets itself to the base brake mode of operation and ABS operation ceases.

Thus, during the ABS re-apply cycle, flow is only permitted around the inner poppet 92. The flow area that is provided around the inner poppet 92 and stem 94 is sufficiently large relative to the ABS apply orifice 88 such that it does not negatively impact ABS apply fluid flow. Therefore, the amount of ABS apply flow to the wheel is primarily governed by a precision sharp edge orifice 88 which minimizes flow variations between the wheels of the vehicle and minimizes variations over the range of operating temperatures of the fluid system. The ABS flow is normally sized to provide optimized conditions on a low to high transition where maximum controlled reapply rates are required. The effective rate may be slowed by providing a pulsed opening of the release solenoid valve 21 to provide short release cycles.

During ABS re-apply operation, the piston return spring 14 is strong enough to open the inner poppet 92 even at master cylinder pressures over 5000 pounds per square inch. The piston return spring 14 is only strong enough to open the outer poppet 82 at approximately 50 pounds per square inch master cylinder to wheel pressure differential. This results in the two-stage effect provided by the two-stage valve 11.

Figure 7:
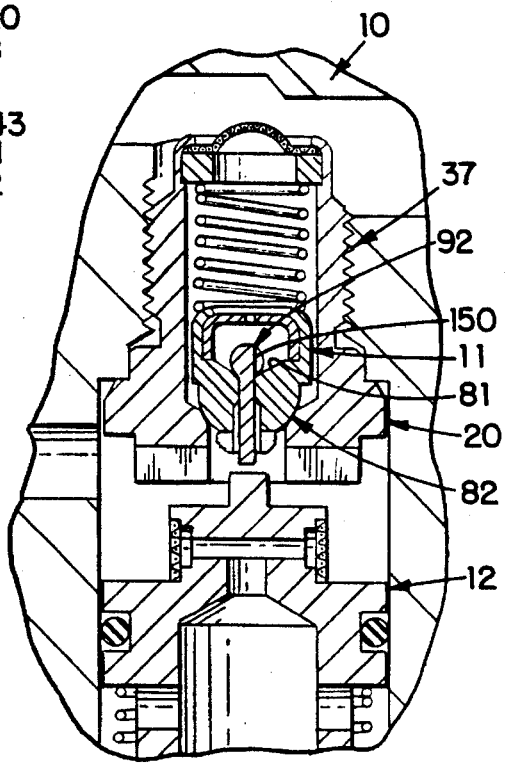
FIG. 7 is a schematic illustration of a two-stage valve detailing optional features of the present invention.

Referring to FIG. 7, an alternative embodiment of the present invention is illustrated. In this embodiment the inner poppet 92 is provided with a small groove 150 that is formed by a process such as precision grinding, laser etching or another similarly precise process which allows a very small quantity of fluid to continuous re-circulate through the system past the valve seat 81. By allowing such a small quantity of fluid to re-circulate even during ABS cycles, pedal pulsation and noise feedback to the driver are reduced. In addition, release-to-apply response times of the system can be shortened, since the pressure differential on the inner poppet 92 during ABS release is reduced.

Figure 8:
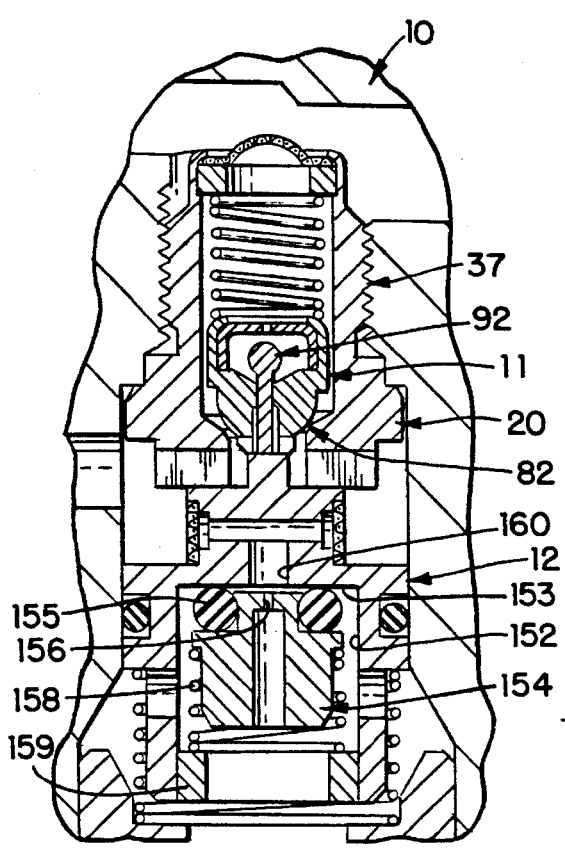
FIG. 8 is a schematic illustration of a two-stage valve detailing optional features of the present invention.

Referring to FIG. 8, an alternate embodiment of the invention is illustrated. In this embodiment the release piston 12 includes an internal bore 152 of substantially constant diameter. A bypass piston 154 is carried in internal bore 152 which carries a seal 155 that is biased toward an end 153 of internal bore 152 and normally sealingly bears thereagainst. A spring 158 biases bypass piston 154 to seal the normal flow path through internal bore 152. Spring 158 is retained in internal bore 152 by a ring 159 which is pressed therein. In the case of the embodiment of FIG. 2, the ABS release orifice 58 in the release piston 12 is sized to permit proper ABS release flow and also to guarantee good low pressure performance. By incorporating the ABS release orifice in the bypass piston 154, which acts as a valve element for the larger orifice 160, the two design characteristics are independently optimized. The ABS release orifice in the bypass piston 154 is designated 156.

In the embodiment of FIG. 8, ABS operation is initiated by energizing the release solenoid valve 21 to initiate an ABS release cycle. Fluid flows from the wheel brake through the ABS release orifice 156, which is now located in the bypass piston 154, through the release solenoid valve 21 and into the pump inlet accumulator 44. When the pressure differential across the bypass piston 154 becomes sufficiently large the spring 158 is compressed moving the bypass piston 154 and opening a flow passage between the end wall 153 and the seal 155 providing a flow path between a much larger orifice 160 and the internal bore 152. The pressure differential required to move the bypass piston 154 against the force of spring 158 is greater than that needed to move the release piston 12, ensuring that the release piston 12 still moves even with lower pressure differentials while reducing the flow restriction imposed by the ABS release orifice. The effective outcome is to permit the use of a release solenoid valve 21 with a smaller effective orifice size. This results in a smaller solenoid valve which utilizes lower amounts of energy for a given vehicle application.

By means of the foregoing structure an effective method of providing ABS control during wheel braking through the use of a single solenoid per wheel system is provided.

What is claimed is:

1. A brake system for controlling fluid flow between a master cylinder and a wheel brake comprising:

a module having a primary bore with a master cylinder port and a wheel brake port, each communicating with the primary bore;

a two-stage valve carried in the primary bore between the master cylinder port and the wheel brake port such that fluid flow between the master cylinder port and the wheel brake port is directed through the two-stage valve, the two-stage valve including a first stage with an outer valve seat and an outer popper biased toward the outer valve seat by an outer poppet spring, and a second stage wherein the outer poppet has a poppet bore and an inner valve seat wherein the poppet bore carries an inner poppet that coacts with the inner valve seat, both the first stage and the second stage being operable to carry the fluid flow wherein the module includes a pump inlet port communicating with the primary bore and further comprising a release piston having a passage, sealingly and slidably carried in the primary bore between the wheel brake port and the pump inlet port such that fluid flow from the wheel brake port to the pump inlet port is directed through the passage.

2. A brake system according to claim 1 wherein the release piston includes a projection engageable with and operable to unseat both the outer poppet and the inner poppet.

3. A brake system according to claim 2 wherein the piston is slidable to unseat the outer poppet and the inner poppet and wherein the piston is slidable to disengage the projection from the inner poppet and the outer poppet for a dead-band travel distance wherein a substantially constant output pressure is maintained.

4. A brake system according to claim 2 wherein the passage in the release piston is capable of carrying an ABS release fluid flow, the passage being continuously open, providing pressure equalization across the release piston when the ABS release fluid flow is stopped.

5. A brake system according to claim 4 further comprising a solenoid operated valve disposed in the primary bore between the release piston and the pump inlet port, the solenoid operated valve being normally closed, stopping the ABS release fluid flow and being openable to initiate the ABS release fluid flow.

6. A brake system according to claim 1 wherein the release piston includes an internal bore and further comprising a bypass piston slidably carried in the internal bore.

7. A brake system according to claim 6 wherein the passage in the release piston is capable of carrying an ABS release fluid flow and further comprising a bypass piston return spring biasing the bypass piston toward the release piston adjacent the passage, the bypass piston including a continuously open release orifice therethrough.

8. A brake system according to claim 7 wherein the ABS release fluid flow is directed through the release orifice and is interruptedly directed though the internal bore around the bypass piston.

9. A brake system comprising:

a hydraulic module having a primary bore capable of carrying a base braking fluid flow, the primary bore carrying a two-stage valve that includes a first stage with an outer valve seat and an outer poppet biased toward the outer valve seat by an outer poppet spring, and a second stage wherein the outer poppet has a poppet bore and an inner valve seat wherein the poppet bore carries an inner poppet that coacts with the inner valve seat, both the first stage and the second stage being capable of carrying the base braking fluid flow, and including a release piston slidably carried in the primary bore and biased toward both the outer and inner poppets by a release piston return spring, the release piston being operable to unseat both the outer poppet and the inner poppet, wherein the release piston includes a projection engageable with both the outer poppet and the inner poppet wherein the release piston includes an internal bore and further comprising a bypass piston slidably carried in the internal bore.

10. A brake system according to claim 9 wherein the release piston includes a passage capable of carrying an ABS release fluid flow and further comprising a bypass piston return spring biasing the bypass piston toward the release piston adjacent the passage, the bypass piston including a continuously open release orifice therethrough.

11. A brake system for controlling fluid flow between a master cylinder and a wheel brake comprising:

a module having a primary bore with a master cylinder port, a wheel brake port and a pump inlet port, each communicating with the primary bore, a pump inlet bore communicating with the pump inlet port and a pump outlet bore communicating with the master cylinder port;

a two-stage valve carried in the primary bore between the master cylinder port and the wheel brake port such that the fluid flow between the master cylinder port and the wheel brake port is directed through the two-stage valve, the two-stage valve including a first stage with an outer valve seat and an outer poppet biased toward the outer valve seat by an outer poppet spring, and a second stage in which the outer poppet has a poppet bore and an inner valve seat wherein the popper bore carries an inner poppet that coacts with the inner valve seat, both the first stage and the second stage being operable to carry the fluid flow;

a release piston having a passage, sealingly and slidably carried in the primary bore between the wheel brake port and the pump inlet port such that fluid flow from the wheel brake port to the pump inlet port is directed through the passage, the release piston including a projection engageable with and operable to unseat both the outer poppet and the inner poppet, wherein the piston is slidable to unseat the outer poppet and the inner poppet under the action of a release piston return spring during base brake operation, wherein the release piston return spring is tailored to ensure that the inner poppet is open and the outer poppet is closed during anti-lock braking pressure re-apply operation, wherein the piston is slidable to disengage the projection from the inner poppet and the outer popper for a dead-band travel distance wherein a substantially constant output pressure is maintained at the wheel brake, wherein the passage in the release piston is capable of carrying an ABS release fluid flow; and a solenoid operated valve disposed in the primary bore between the release piston and the pump inlet port, the solenoid operated valve being normally closed, stopping the ABS release fluid flow and being openable to initiate the ABS release fluid flow.

* * * * *